United States Patent Office 2,884,390
Patented Apr. 28, 1959

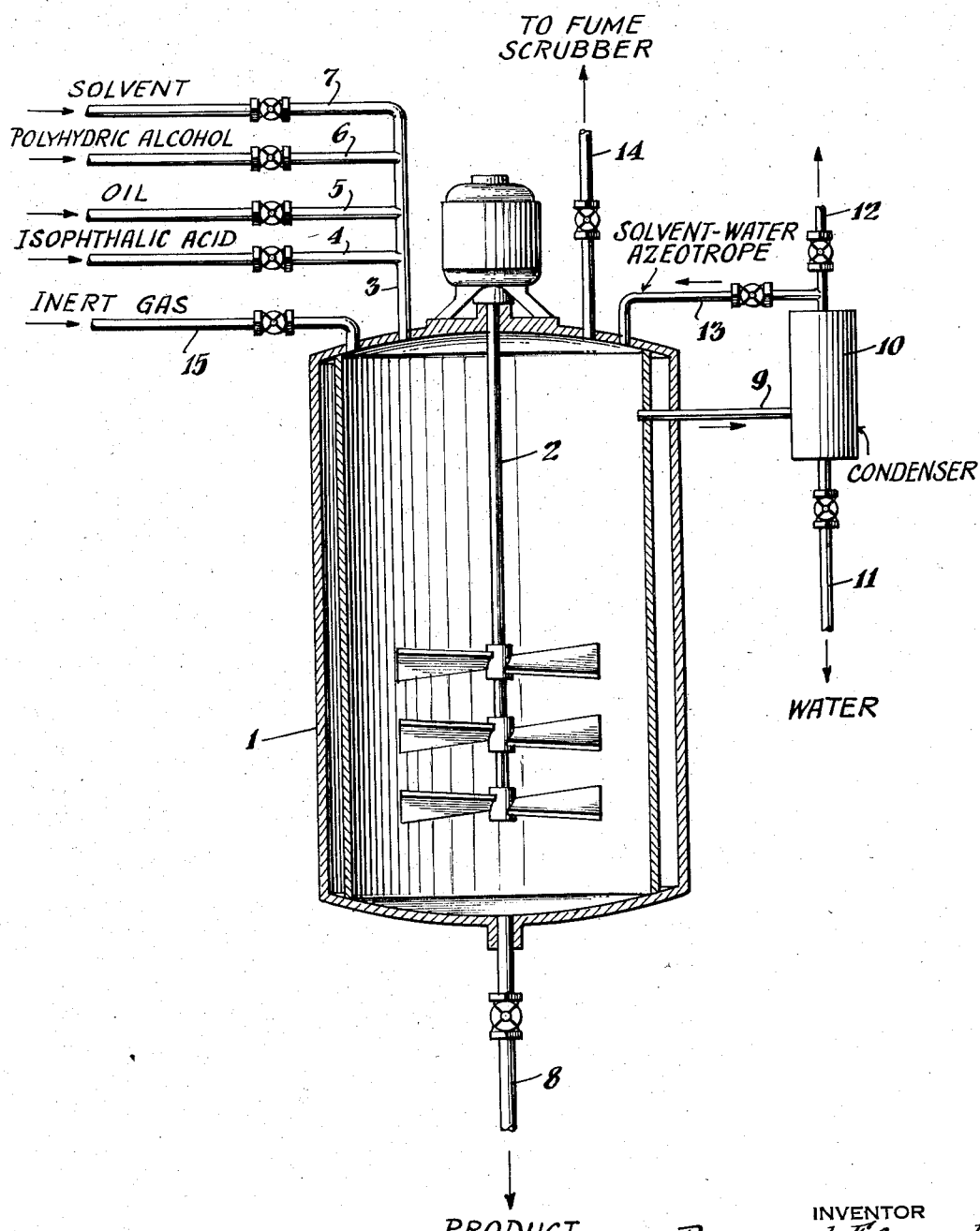

2,884,390

ALKYD RESIN MANUFACTURE WITH ISOPHTHALIC ACID

Raymond F. Carmody, Metuchen, N.J., assignor to Socony Mobil Oil Company, Inc., a corporation of New York Application May 2, 1957, Serial No. 656,546

10 Claims. (Cl. 260—22)

This invention has to do with the manufacture of alkyd resins and, more particularly, with the manufacture of alkyd resins prepared with isophthalic acid.

Alkyd resins are well known in the art as those which are formed by condensation of a polybasic acid or anhydride thereof (e.g., phthalic acid or anhydride) with a polyhydric alcohol (e.g., glycerol). Such resins have been modified in numerous ways, for example by modification with vegetable oils. The customary procedure for effecting this modification involves reaction (alcoholysis) of a vegetable oil with a polyhydric alcohol; the alcoholysis reaction is followed by condensation of the alcoholysis product with a dibasic acid. This procedure has been found to be satisfactory with materials hitherto available for use in forming alkyd resins.

Oil modified alkyd resins have been classified into "short oil," "medium oil" and "long oil" alkyds, as indicated in "Stewart's Scientific Dictionary," J. R. Stewart, 1953, 4th edition, published by the Stewart Research Laboratory, Alexandria, Virginia. "Short oil" alkyds usually contain at least 45 percent oil as a modifier based on the weight of the oil-modified alkyd. "Medium oil" alkyds usually contain 45–55 percent of oil. "Long oil" alkyds usually contain greater than 60 percent of oil. These terms are used herein in the manner defined by Stewart.

Recently, isophthalic acid became available in commercial quantities. When the customary procedure referred to above was tried with isophthalic acid, it was found that the condensation of said acid with the vegetable oil-polyhydroxy alcohol product proceeds at only a slow rate, and that the isophthalic acid sublimes. This latter disadvantage leads to accumulations of isophthalic acid in the overhead charge and discharge lines or pipes associated with the vessel in which the alkyd resin is made. With such accumulations in the pipes, heat exchange is reduced materially. As a further difficulty, isophthalic acid is not soluble in most solvents; thus, its removal from the pipes is a distinct and expensive problem. Moreover, with isophthalic acid, it is necessary to carry out reaction at a temperature below the melting point of the acid to avoid excessive sublimation and to avoid destruction of the oil. This results in a two-phase system; the upper phase is liquid containing oil and alcoholized oil, and the lower phase is solid isophthalic acid.

It is an object of this invention, therefore, to provide a rapid and efficient process for preparing alkyd resins derived from isophthalic acid. A further object of the invention is to prepare said resins without sublimation of the isophthalic acid and without the aforesaid difficulties flowing from said sublimation.

Still another object is to provide a single-phase system for preparing the alkyd resins from isophthalic acid.

Additional objects are indicated by the following description of the invention.

It has now been discovered that the aforementioned objects are realized by use of a new procedure in which:

(1) A vegetable oil is heated to a temperature from about 450° F. to about 575° F. with isophthalic acid in the presence or absence of an acidolysis catalyst;

(2) Cooling the reaction mixture of step (1) to a temperature from about 400° F. to about 475° F.; and (3) Adding to the cooled reaction mixture, a polyhydroxy compound, and heating the resulting mixture to a temperature from about 400° F. to about 500° F. until the desired product is formed.

This new procedure makes possible about a fifty percent reduction in time of preparing a given quantity of resin, in comparison with the aforesaid customary procedure, and is characterized by freedom from isophthalic acid sublimation.

In the initial step of the new procedure, a vegetable oil or oils and isophthalic acid are charged to a reactor. All of the oil and dibasic acid are so charged. There is no need to add one of these reactants to the other in increments, as is necessary when o-phthalic acid is used in place of isophthalic acid. An acidolysis or transesterification catalyst such as litharge, calcium oxide, lithium hydroxide, lead naphthenate, calcium naphthenate and the like, can be included, but is not essential for reaction. Catalytic amounts of the catalysts are used, that is, of the order of 0.1 percent based upon the total weight of reactants in step (1). The catalysts are used more often when step (1), above, is conducted at the lower end of the 450–575° F. temperature range. The oil and acid, and catalyst if present, are heated to a temperature between about 450° F. and about 575° F., preferably about 575° F., and are so maintained for a period of time of up to one hour. Then, heat is no longer supplied to the reactor and its contents, with the latter being cooled to a temperature between about 400° F. and about 475° F., preferably about 400° F. To the cooled mixture, the required quantity of polyhydroxy compound is added. Here again, the reactant—in this instance, the polyhydroxy compound—is added as a single charge, rather than in increments. Heat is supplied to the reaction vessel and the temperature of the contents is increased to between about 400° F. and about 500° F. When short oil alkyds are prepared, it is preferred that the temperature be maintained at the lower end of the 400–500° F. range. When long oil alkyds are prepared, it is preferable that temperatures be maintained at the higher end of the 400–500° F. range.

It is advantageous to use a solvent, preferably a xylene, and to operate at temperatures at which the solvent refluxes. Other suitable solvents are benzene and aromatic fractions which reflux at the temperatures used herein.

The alkyd mixture resulting from addition of the polyhydroxy compound to the cooled oil-isophthalic acid product, is sampled from time to time during the reaction, and the rate of cure and acidity are determined in order to follow the progress of the reaction. The total time to complete the reaction is usually of the order of 3 to 4 hours. The rate of cure is determined by following "cure time" of the product. "Cure time," as used herein, is the time in seconds for a film 0.0015 inch thick to convert to an infusible, insoluble condition on a stainless steel surface at 230° C.

As indicated by the foregoing description of the procedure, the equipment used is of conventional nature. A heated kettle is used such as a Dowtherm, equipped with agitating means, overhead charge lines for delivering the reactants to the kettle, an overhead discharge line fitted with a condenser for condensing water formed in the reactions, and a bottom line for discharging product. High pressures are not developed during the procedure; thus, pressure equipment is not necessary. As a rule, only atmospheric pressures prevail.

Typical equipment in which the novel procedure of this invention can be carried out, is illustrated in the accompanying figure. Heated kettle 1 is equipped with motor-driven agitator 2, and with inlet line 3 for introducing reactants. Connected with line 3 are valved lines 4, 5, 6 and 7 through which are charged, respectively: isophthalic acid, oil, polyhydric alcohol and solvent. Outlet line 8 is at the bottom of kettle 1, for withdrawal of product. Located at an upper portion of kettle 1 is vapor line 9 through which vapors are taken to condenser 10. The latter is equipped with water withdrawal line 11 and with overhead line 12. Connected with line 12 is line 13 for return of solvent-water azeotrope to kettle 1. Located also at an upper portion of kettle 14 is vapor line 14 which leads to a vapor scrubber (not shown). Line 15 is also joined to the top of kettle 1; inert gas can be introduced through this line.

An inert gas, such as nitrogen and/or carbon dioxide, can be bubbled through the reaction mixtures during the new procedure to exclude air from the reaction vessel or kettle and to assist in removing water vapor formed in the esterification reaction (oil-isophthalic acid product reacted with polyhydroxy compound).

Vegetable oils useful herein can be either unsaturated or saturated, typical of which are: linseed oil, soybean oil, dehydrated castor oil, coconut oil and safflower oil. Of such oils, soy bean oil is preferred. It is to be understood that highly unsaturated oils such as tung oil and oiticica oil, can be used in combination with the aforesaid oils; however, highly unsaturated oils gel at such relatively low temperatures, that they should not be used as the sole oil source. Thus, it is recommended that an acidolysis temperature at the lower end of the range 450–575° F. be maintained, when the iodine value of the oil is above about 150 or when conjugated unsaturation is present in the oil charge.

As indicated, saturated aliphatic polyhydric alcohols are used in forming the alkyd resins of this invention. Typical alcohols include: glycols, glycerol, trimethylolethane, trimethylolpropane, pentaerythritol and sorbitol. Of such alcohols, pentaerythritol is preferred.

As indicated, the polybasic acid used herein is isophthalic acid. Contemplated also herein is that relatively minor proportions of other polybasic acids (or their corresponding anhydrides) can be used together with a major proportion of isophthalic acid. That is, o-phthalic acid, terephthalic acid, maleic acid, fumaric acid, etc., can be so used, with the proportion thereof being less than about ten percent by weight of the total polybasic acid reactant; the isophthalic acid content should be at least about ninety percent of this total.

The relative proportions of vegetable oil, isophthalic acid and polyhydroxy compound, can be varied considerably. Yet, the oil in the alkyd resin product should not be more than about ninety percent by weight of the combined weight of the several reactants. The minimum amount of oil should not be appreciably less than about thirty-five percent by weight. The polyhydric alcohol must be used in an amount sufficient to provide at least one hydroxyl group for each carboxylic acid radical. In practice, the alcohol is usually employed in an amount exceeding by at least five percent, the proportion theoretically required for complete esterification of all the carboxylic acids in the reaction mixture. In preparing short oil alkyds, the amount of alcohol will be in excess by at least about twenty-five percent. Isophthalic acid is used in amounts ranging from about ten to about forty percent of the total weight of all reactants.

The following examples provide a comparison of the new procedure of this invention and of the previously used procedure for preparing alkyd resins. In the examples, the amounts are specified as parts by weight. The Gardner scale is used in reporting viscosity and color.

Example 1

Seven hundred and fifty parts of soya bean oil and 150 parts of isophthalic acid were charged to a closed kettle of the character described hereinabove. Agitation was continued throughout the preparation. Heat was supplied to the kettle and the temperature of the contents was raised to about 575° F. Approximately one-half hour was required to bring the reactants to this temperature. One part of litharge was charged to the kettle twenty-five minutes after the initial charge to the kettle.

Heat was discontinued to the kettle such that the temperature of the contents decreased to about 400° F.; approximately one hour elapsed for the temperature to fall from 575° F. to 400° F. At this stage, 103 parts of pentaerythritol were charged to the kettle. Mineral spirits (a solvent, a hydrocarbon fraction) was added, in sufficient quantity to maintain the desired reflux temperature; approximately 90 parts were added. Heat was again furnished to the kettle in order to bring the contents to a temperature of about 500° F., time required being about one and one-half hours. A temperature of 500° F. was maintained for about three hours, whereupon the final product was withdrawn from the kettle. Additional mineral spirits was added to reduce the resin to 70% solids. The total amount of water collected from the esterification reaction constituted 44 parts.

The mineral spirits used is a hydrocarbon fraction having the following characteristics: Flash, 100° F. minimum; boiling range, 300–395° F.; color, Saybolt plus 25 minimum.

The final product has a viscosity of Z+ (Gardner viscosity scale); color of 6 (Gardner—1933—color scale); non-volatile content expressed as percent of total of 70 (mineral spirits); and an acid number of 8.0.

The product is a typical long oil alkyd prepared by the process of this invention.

The soya bean oil used herein has the following characteristics:

| | |
|---|---|
| Iodine number | 127–138 |
| Acid number | 0.3–0.6 |
| Saponification number | 186–196 |
| Specific gravity | 0.916–0.926 |
| Weight/gallon | 7.6–7.7 |
| Color (Gardner) | 3–5 |
| Viscosity | G–H |

Example 2

The procedure described in Example 1, above, was repeated with only one change being made. That is, the soya bean oil and pentaerythritol were heated together with litharge as the alcoholysis catalyst until alcoholysis was complete. Thereafter isophthalic acid was added thereto.

It was found that a substantial portion of the isophthalic acid sublimed and accumulated in the outlet pipes, namely, lines 12 and 14 of Figure 1. Further, instead of an overall preparation time of six hours, as in Example 1, the time involved was eleven hours to produce a product having comparable properties.

Example 3

A short oil alkyd was prepared by the procedure followed in Example 1, above.

Eight hundred parts of the soya bean oil and 760 parts of isophthalic acid were charged to the closed kettle. Two parts of lead naphthenate (alcoholysis catalyst) were added. Five parts of triphenyl phosphite, which serves as a bleaching agent, were also added. The kettle was heated, the contents being heated to 575° F. in a period of forty-five minutes. Then, heat was discontinued; after twenty-five minutes, the temperature had dropped to 500° F. One hundred and twenty-six parts of benzoic acid were then added; benzoic acid serves as a "chain stopper" of the resin. When the temperature had fallen to 450°

F., 415 parts of glycerine were charged. Heat was again provided. About 90 parts of xylene (solvent) were added to the kettle. The contents were then maintained at 450° F., with xylene reflux, for about one-and-a-half hours; then, at 400–425° F. for about four hours. The total amount of water collected from the esterification reaction was 190 parts (theoretical, 188 parts).

The final product is a short oil alkyd having the following properties: viscosity of $Z_2+$; color 5–6; acid number of 8.0.

The alkyd resins prepared with isophthalic acid have excellent characteristics. For example, they have: superior drying time, water and alkali resistance, gloss retention for enamels made therewith. High oil content alkyds prepared from isophthalic acid are light-colored, fast-drying and of high viscosity.

I claim:

1. The method for preparing an oil-modified alkyd resin from isophthalic acid, which comprises: (1) reacting together a vegetable oil and isophthalic acid at a temperature from about 450° F. to about 575° F.; (2) cooling the reaction mixture of (1) from a temperature from about 450° F. to about 575° F., to a substantially lower temperature within the temperature range of from about 400° F. to about 475° F.; and (3) reacting a saturated aliphatic polyhydric alcohol with the cooled reaction mixture (2) at a temperature between about 400° F. and about 500° F., whereupon said oil-modified alkyd resin is formed; the proportion of vegetable oil being from about thirty-five to about ninety percent by weight of the total reactants, of polyhydric alcohol being at least sufficient for complete esterification of all carboxylic acids present in the reaction mixture (2), and of isophthalic acid being from about ten to about forty percent by weight of said total.

2. The method defined by claim 1 wherein the vegetable oil is soya bean oil.

3. The method defined by claim 1 wherein the polyhydric alcohol is pentaerythritol.

4. The method defined by claim 1 wherein the isophthalic acid is in admixture with a compound other than isophthalic acid selected from the group consisting of a polycarboxylic acid and a polycarboxylic anhydride, said compound comprising less than about ten percent by weight of the total polycarboxylic acid mixture.

5. The method defined by claim 1 wherein the temperatures are about 575° F. in step (1), about 400° F. in step (2) and about 500° F. in step (3).

6. The method defined by claim 1 wherein the temperatures are about 575° F. in step (1), about 450° F. in step (2) and about 425° F. in step (3).

7. The method defined by claim 1 wherein a small amount of an acidolysis catalyst is added in step (1).

8. The method defined by claim 1 wherein about 0.1 percent by weight, based upon the total weight of vegetable oil and isophthalic acid, of litharge is added in step (1).

9. The method defined by claim 1 wherein about 0.1 percent by weight, based upon the total weight of vegetable oil and isophthalic acid, of lead naphthenate is added in step (1).

10. The method defined by claim 1 wherein the saturated aliphatic polyhydric alcohol is glycerine.

References Cited in the file of this patent

UNITED STATES PATENTS

| | | |
|---|---|---|
| 1,888,849 | Dawson | Nov. 22, 1932 |
| 2,627,508 | Lum | Feb. 3, 1953 |

OTHER REFERENCES

Ellis: The Chemistry of Synthetic Resins, page 921, vol. II; published, 1935, Reinhold Publishing Corp., New York, N.Y. (Copy in Scientific Library.)